(12) United States Patent
Yamada

(10) Patent No.: US 12,494,688 B2
(45) Date of Patent: Dec. 9, 2025

(54) ROTOR PROVIDED WITH END PLATE AND ELECTRIC MOTOR

(71) Applicant: Fanuc Corporation, Yamanashi (JP)

(72) Inventor: Yasuo Yamada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 206 days.

(21) Appl. No.: 18/272,829

(22) PCT Filed: Jan. 17, 2022

(86) PCT No.: PCT/JP2022/001428
§ 371 (c)(1),
(2) Date: Jul. 18, 2023

(87) PCT Pub. No.: WO2022/158426
PCT Pub. Date: Jul. 28, 2022

(65) Prior Publication Data
US 2024/0088733 A1    Mar. 14, 2024

(30) Foreign Application Priority Data
Jan. 22, 2021   (JP) .................................. 2021-008934

(51) Int. Cl.
*H02K 1/27*     (2022.01)
*H02K 1/278*    (2022.01)
*H02K 1/28*     (2006.01)

(52) U.S. Cl.
CPC .............. *H02K 1/28* (2013.01); *H02K 1/278* (2013.01)

(58) Field of Classification Search
CPC ................................. H02K 1/28; H02K 1/278
See application file for complete search history.

(56) References Cited

U.S. PATENT DOCUMENTS

| 2012/0139382 A1* | 6/2012 | Yamagishi | ............... H02K 1/28 310/156.61 |
| 2012/0187794 A1 | 7/2012 | Inoue et al. | |

(Continued)

FOREIGN PATENT DOCUMENTS

| CN | 107887995 A | 4/2018 |
| JP | 2007252079 A | 9/2007 |

(Continued)

OTHER PUBLICATIONS

International Search Report and Written Opinion for International Application No. PCT/JP2022/001428, dated Mar. 15, 2022, 5 pages.

*Primary Examiner* — Thomas Truong
(74) *Attorney, Agent, or Firm* — BUCHANAN INGERSOLL & ROONEY PC

(57) ABSTRACT

Provided are: a rotor provided with a magnetic end plate and a structure for suppressing magnetic flux leakage; and an electric motor having this rotor. The rotor has a rotor core of an approximately cylindrical shape, a plurality of magnets supported by the rotor core, and two end plates arranged at either end surface in the axial direction of the rotor core, the end plates being formed of a magnetic material. Each end plate has an approximately circular shape corresponding to the radial cross-section of the rotor core, and a circumferential portion of the end plate has, as seen in the axial direction, concave portions that partially cover the magnets, and convex portions that are positioned between the plurality of magnets and have larger dimensions in the radial direction than the concave portions.

6 Claims, 9 Drawing Sheets

(56) References Cited

U.S. PATENT DOCUMENTS

2020/0028394 A1    1/2020  Tatsunaga
2021/0159744 A1*  5/2021  Sugimoto .............. H02K 1/274

FOREIGN PATENT DOCUMENTS

| | | | |
|---|---|---|---|
| JP | 2012105465 A | * | 5/2012 |
| JP | 2013027258 A | | 2/2013 |
| JP | 2014072971 A | | 4/2014 |
| JP | 2017005871 A | | 1/2017 |
| JP | 2020014300 A | | 1/2020 |
| WO | 2011040247 A1 | | 4/2011 |

* cited by examiner

ROTOR PROVIDED WITH END PLATE AND ELECTRIC MOTOR

CROSS REFERENCE TO RELATED APPLICATIONS

This is the U.S. National Phase application of PCT/JP2022/001428, filed Jan. 17, 2022, which claims priority to Japanese Patent Application No. 2021-008934, filed Jan. 22, 2021, the disclosures of each of these applications being incorporated herein by reference in their entireties for all purposes.

FIELD OF THE INVENTION

The present invention relates to a rotor having an end plate positioned on an end surface of a rotor core, and an electric motor having the rotor.

BACKGROUND OF THE INVENTION

An electric motor includes a rotor rotating about a rotation axis, and a stator positioned around the rotor. The rotor has a shaft extending along the rotation axis, a rotor core fixed to the shaft, and a magnet fixed to the rotor core.

As a structure of a rotor of the prior art, there is known one wherein end plates are arranged so as to sandwich both end surfaces of a rotor core in the direction in which the rotation axis extends (e.g., see Patent Literature 1 to 3).

PATENT LITERATURE

[PTL 1] JP 2013-027258 A
[PTL 2] WO 2011/040247 A1
[PTL 3] JP 2017-005871 A

SUMMARY OF THE INVENTION

A plurality of magnets fixed to the rotor core are arranged, for example, with alternating north and south magnetic poles on an outer surface of the magnet. In order for the electric motor to rotate efficiently, it is preferable that the magnetic flux exiting the north pole of the outer surface of one magnet pass through the stator core of the stator and progress to the south pole of the other magnet. In other words, it is preferable that the magnetic field line progress from the outer surface of one magnet through the stator core to the surface of the other magnet.

In a structure wherein an end plates are arranged on both sides of a rotor core in the axial direction, the end plates either come into contact with end surfaces of magnets fixed to the rotor core, or are arranged with a slight gap from the magnets. In this case, when the end plates are made of a magnetic material, the magnetic field line extending from the N pole of one magnet passes through the end plate toward the S pole of the same magnet. Therefore, there is a problem in that a loop of magnetic field line is formed at the N and S poles of the magnet, and the magnetic flux leaks out. The flux leakage reduces the magnetic force which contributes to the torque generated by the motor. Further, the formed loop of magnetic field line extends through the end plate, the end plate may be heated and iron loss may occur.

Therefore, in the prior art, the end plates sandwiching the rotor core may be made of a non-magnetic material such as stainless steel or aluminum. However, stainless steel and aluminum are more expensive than magnetic materials such as iron. As a result, there is a problem in that the rotor and the electric motor having the rotor are also expensive.

One aspect of the present disclosure is a rotor comprising: a rotor core configured to rotate about a rotation axis; a plurality of magnets attached to a surface of the rotor core; and two end plates made of magnetic material, which are positioned so as to sandwich both end surfaces of the rotor core in an axial direction of the rotation axis, wherein an outer peripheral part of at least one of the two end plates has a concave part which partially covers each of the magnets when viewed in the axial direction, and a convex part having a dimension larger than the concave part in a radial direction of the rotor core, and positioned between the plurality of magnets.

Another aspect of the present disclosure is an electric motor comprising: the rotor according to the above aspect; and a stator in which the rotor is arranged.

According to the aspect of the present disclosure, by providing the concave part and convex part on the outer periphery of the end plate of the rotor, it is possible to effectively reduce the leakage of magnetic flux from the end plate even though the end plate has magnetism. Therefore, the costs of the rotor and the electric motor can be reduced, and the performance of the electric motor can be improved.

DETAILED DESCRIPTION OF EMBODIMENTS OF THE INVENTION

First Example

Figure 1:
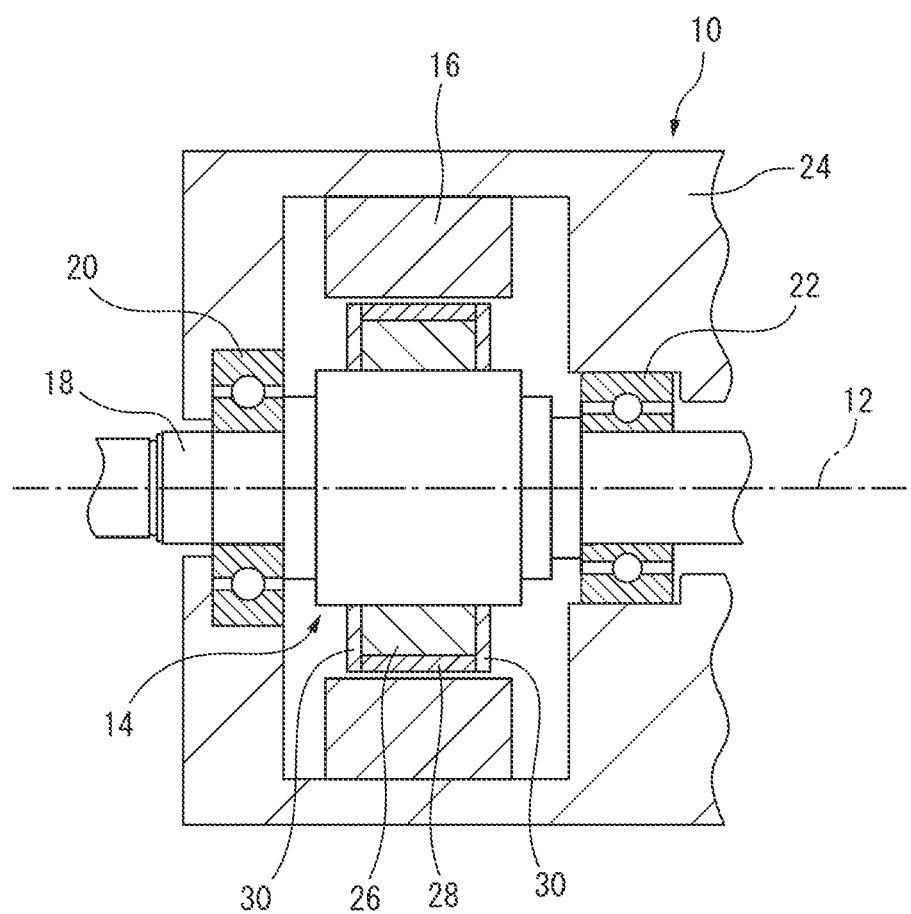
FIG. 1 is an axial sectional view of an electric motor according to the one embodiment.

FIG. 1 is an axial sectional view showing a schematic configuration of an electric motor (rotating motor) 10 having a rotor according to a preferred embodiment. The electric motor 10 has a rotor 14 configured to rotate about a rotation axis 12, and a stator 16 in which the rotor 14 is arranged. The rotor 14 has a generally column-shaped shaft 18 configured to rotate about the axis 12, and the shaft 18 is rotatably supported by bearings 20, 22. The stator 16 has, for example, a stator core formed by laminating a plurality of electromagnet steel plates is the axial direction of the shaft 18, and a plurality of coils (not shown) supported by the stator core and arranged in the circumferential direction. In the illustrated example, the stator 16 is fixed to a housing 24, by which the bearings 20, 22 are supported.

Figure 2:
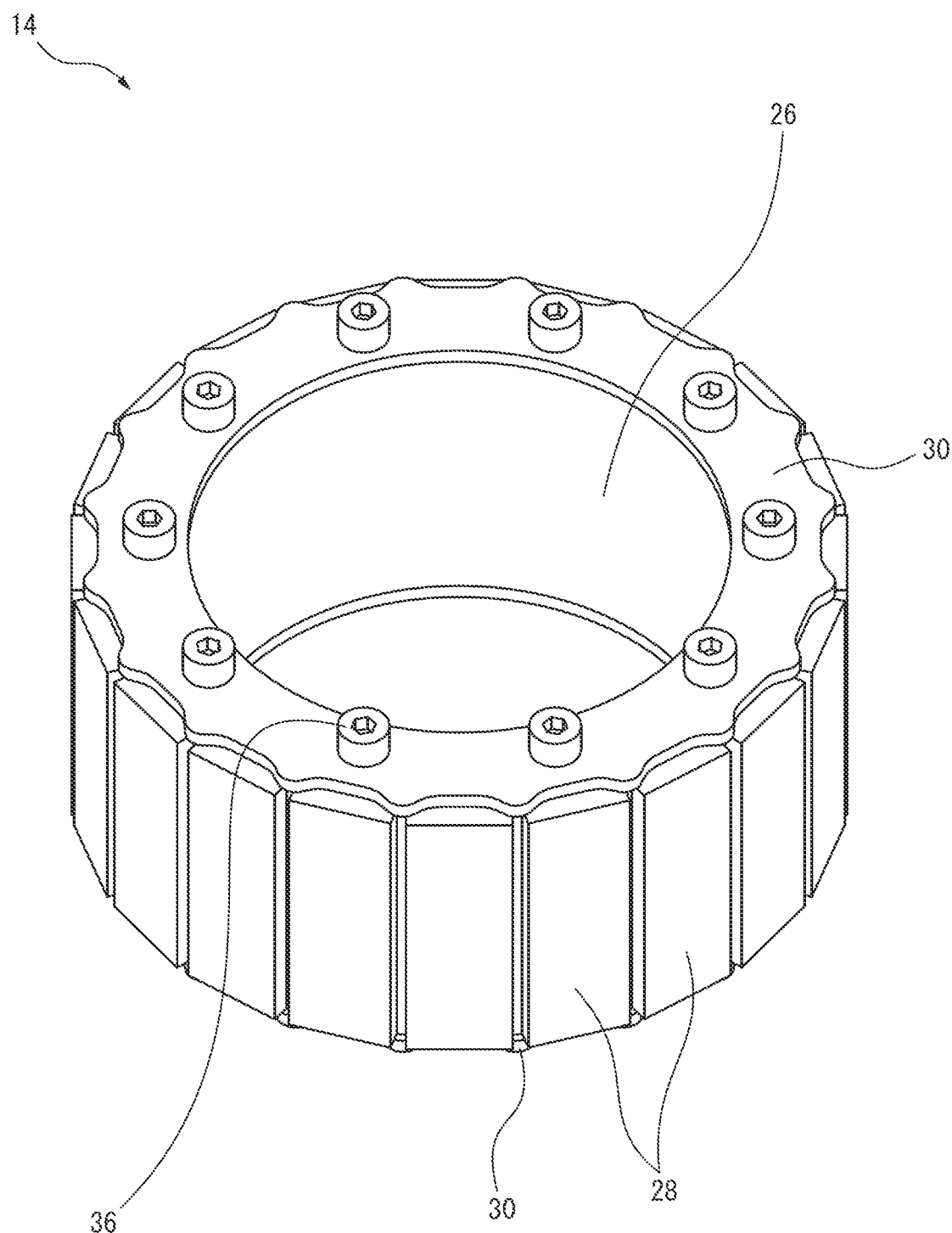
FIG. 2 is a perspective view of a rotor according to a first example.
Figure 3:
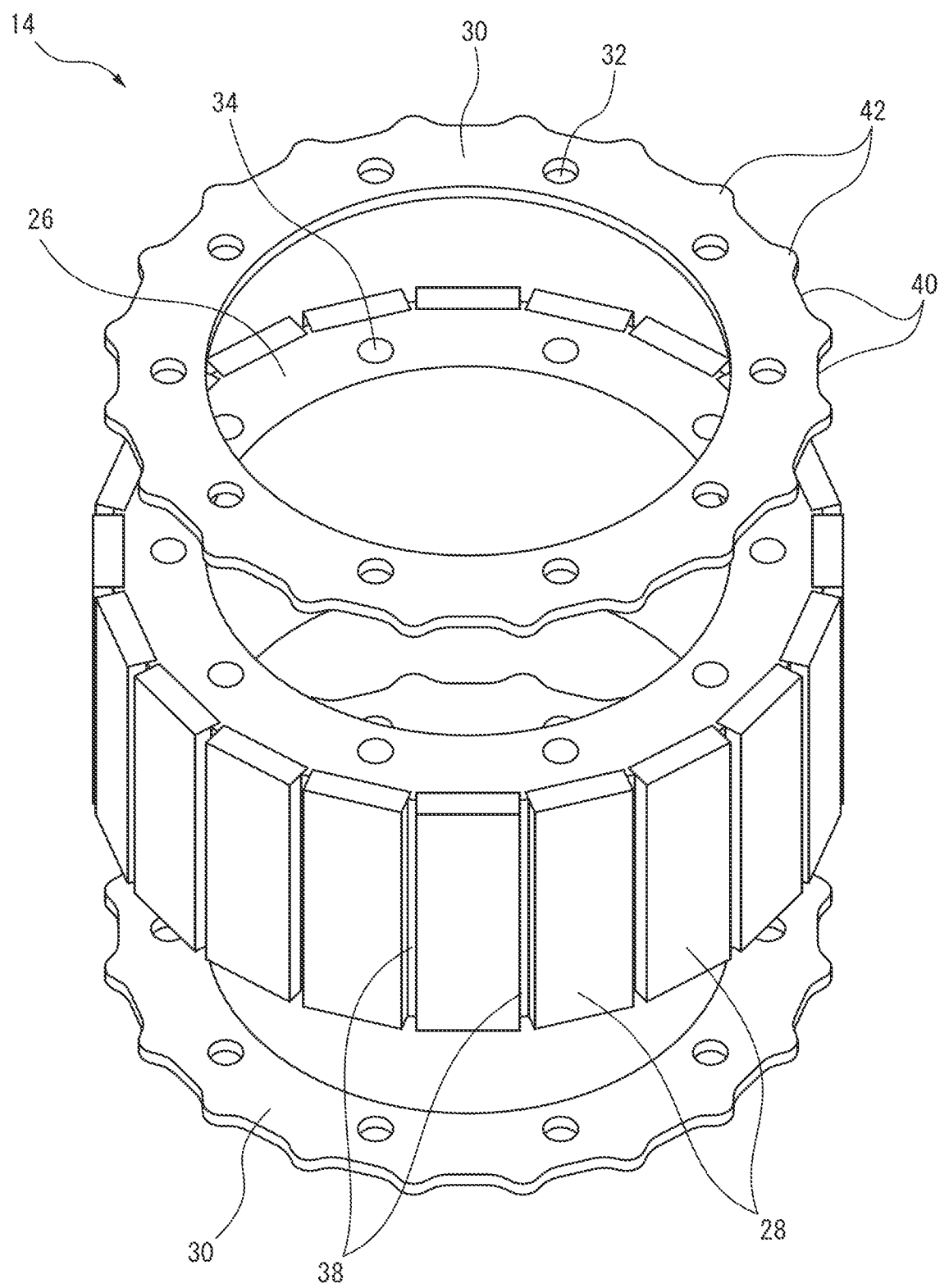
FIG. 3 is an exploded perspective view of the rotor of FIG. 2.

FIGS. 2 and 3 are a perspective view and an exploded perspective view of the rotor 14, respectively. The rotor 14 has a generally cylindrical rotor core 26 fixed to the shaft 18, a plurality of magnets 28 supported by the rotor core 26, and two end plates 30 made of magnetic material such as iron, which are positioned so as to sandwich both end surfaces of the rotor core 26 in the axial direction. A form of connection between the rotor core 26 and the shaft 18 may be, for example, shrink fitting. The end plate 30 may be, for example, connected to the rotor core 26 by a fastener 36 such as a bolt, which extends through both a hole 32 formed in the end plate 30 and a hole 34 formed in the rotor core 26.

The rotor core 26 is formed of a single magnetic member, for example, can be formed by cutting a member whose main component is iron. However, the structure of the rotor core is not limited as such, and may, for example, be formed as a laminate body formed by laminating a plurality of magnetic steel plates in the axial direction (see FIG. 7 explained below).

The plurality of magnets 28 are arranged on the outer peripheral surface of the rotor core 26, and are permanent magnets formed in a plate shape in the illustrated example. The plurality of magnets 28 are arranged at regular intervals along the circumferential direction, and the number of magnets depends on the number of poles of the rotor 14. An arbitrary number of magnets 28 may be fixed to the rotor core 26 with an adhesive, etc. according to the number of poles of the rotor 14. As shown, the rotor 14 is a surface magnet type (SPM type) rotor in which the plurality of magnets 28 are arranged on the surface of the rotor core 26.

Each of the magnets 28 extends from one end to the other end of the rotor core 26 in the axial direction, and the axial length of the magnet 28 is equal to or less than the length of the rotor core 26. Also, the plurality of magnets 28 are arranged so as to alternate N poles and S poles along the circumferential direction.

Figure 4:
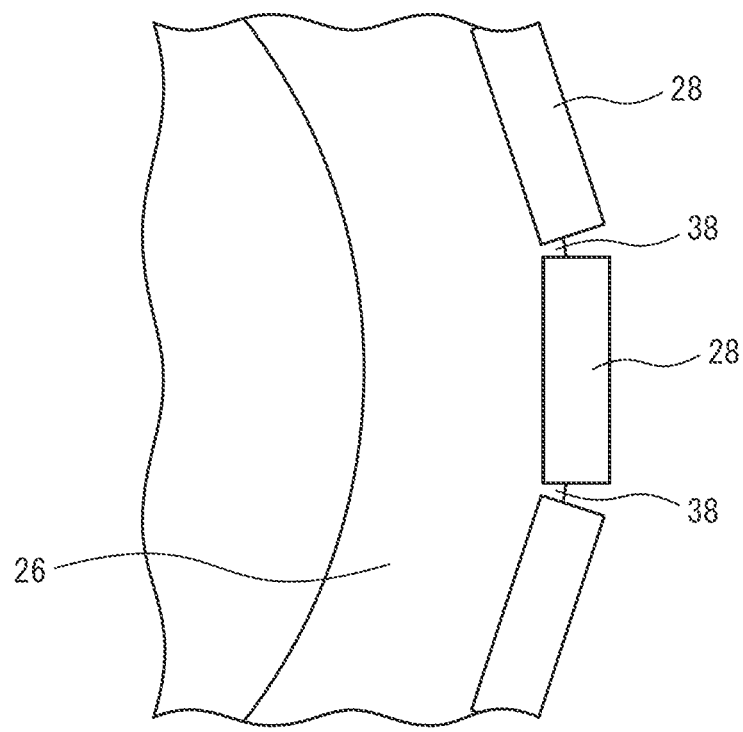
FIG. 4 is a partial enlarged view of a rotor core of FIG. 2.

As shown in FIG. 4, the rotor core 26 may optionally have an engaging part 38 for positioning the magnet 28. Concretely, the engaging part 38 is positioned between the plurality of magnets 28, engages a side surface of each of the magnets, and has a dimension larger in the radial direction than a portion of the rotor core 26 to which the magnet 28 is attached. In the example of FIG. 3, the engaging part 38 is a ridge formed on the outer peripheral surface of the rotor core 26 and extending from one end to the other end of the rotor core 26 in the axial direction. The engaging part 38 is configured to abut on the side surfaces of the magnets 28, thereby enabling each magnet 28 to be accurately positioned and fixed on the rotor core 26.

Figure 5:
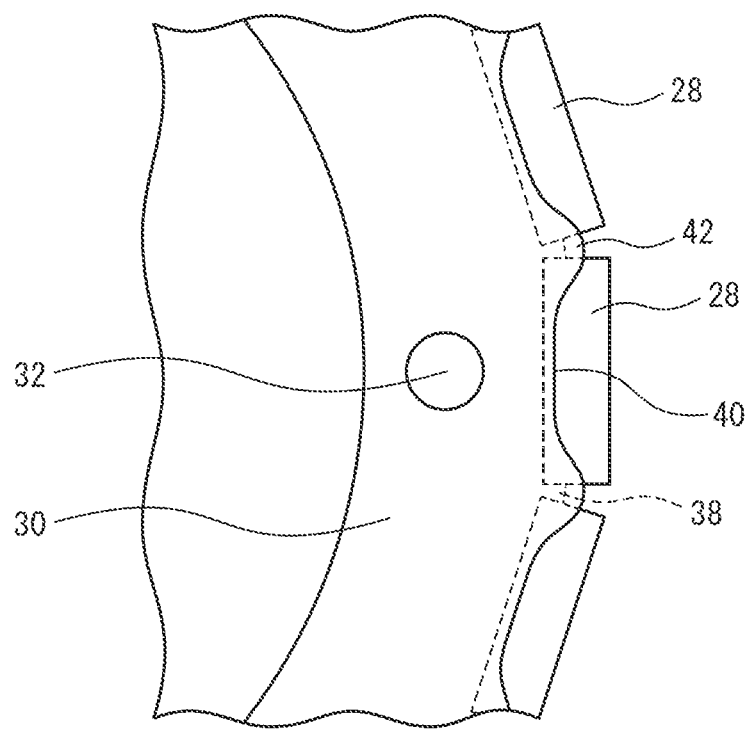
FIG. 5 is a partial enlarged view wherein an end plate is arranged in FIG. 4.

FIG. 5 is an enlarged view showing the positional relationship between the end plate 30 and the magnet 28. Each of the end plates 30 has a substantially annular shape corresponding to the radial cross section of the rotor core 26. The outer peripheral part of the end plate 30 has a concave part 40 which partially covers each of the magnets 28 when viewed in the axial direction, and a convex part 42 positioned between the plurality of magnets 28 and having a larger dimension than the concave part 40 in the radial direction.

Figure 6:
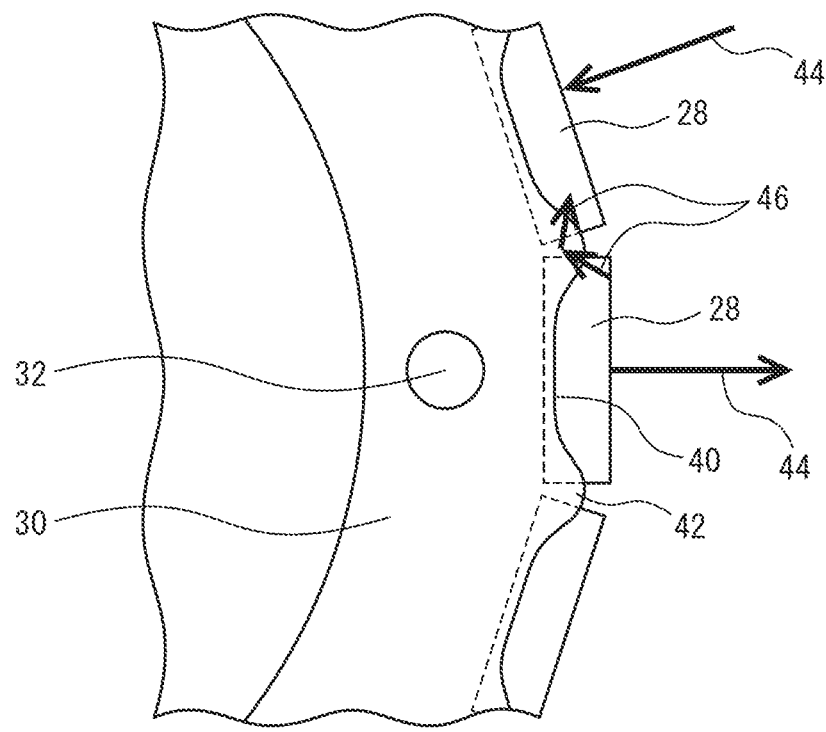
FIG. 6 is a view showing the direction of a flux around the end plate.

FIG. 6 is a diagram explaining the directions of main magnetic fluxes around the end plate 30. As described above, when the magnetic material such as the end plate 30 abuts or is close to the end surface of the magnet 28, the magnetic flux of the magnet 28 may leak. In this case, as indicated by an arrow 44, since the magnetic flux is relatively large at the central part in the circumferential direction of each magnet 28, the leakage of the magnetic flux has a large adverse effect on the motor characteristics. Therefore, in the present embodiment, the concave part 40 of the end plate 30 is configured to contact or be close to the area including the circumferential center of the magnet 28 when viewed in the axial direction so that the contact area between the end plate 30 and the magnet 28 is small at the circumferential center of the magnet 28, thereby the amount of leakage of magnetic flux is reduced.

On the other hand, the magnetic flux at the circumferential ends of each magnet 28 is inherently prone to shorting with adjacent magnets as indicated by arrows 46, and contributes less to the torque of the motor. Therefore, in the present embodiment, the convex part 42 of the end plate 30 is configured to contact or be close to the area including the circumferential ends of the magnet 28 when viewed in the axial direction so that the contact area between the end plate 30 and the magnet 28 is large at the circumferential ends of the magnet 28, in order to prioritize prevention of damage to the rotor core 26 over reduction of magnetic flux leakage.

Figure 7:
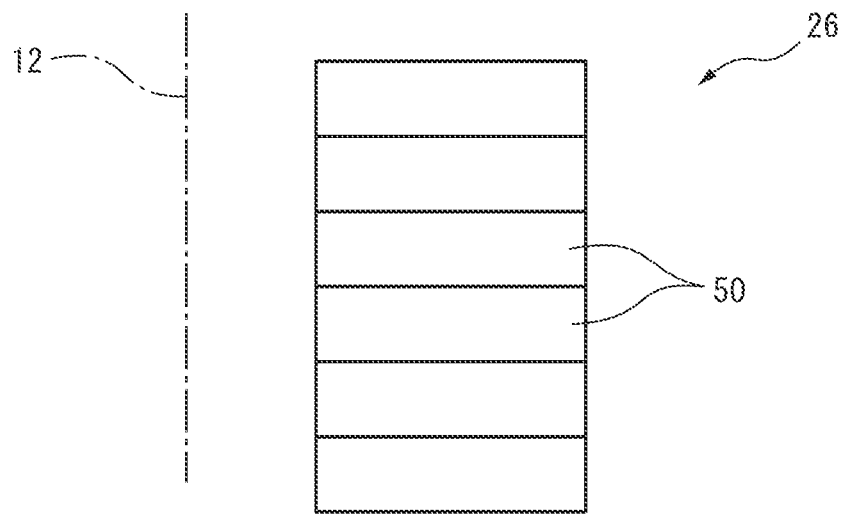
FIG. 7 is a schematic view showing the rotor core is a laminate of electromagnetic steel plates.
Figure 8:
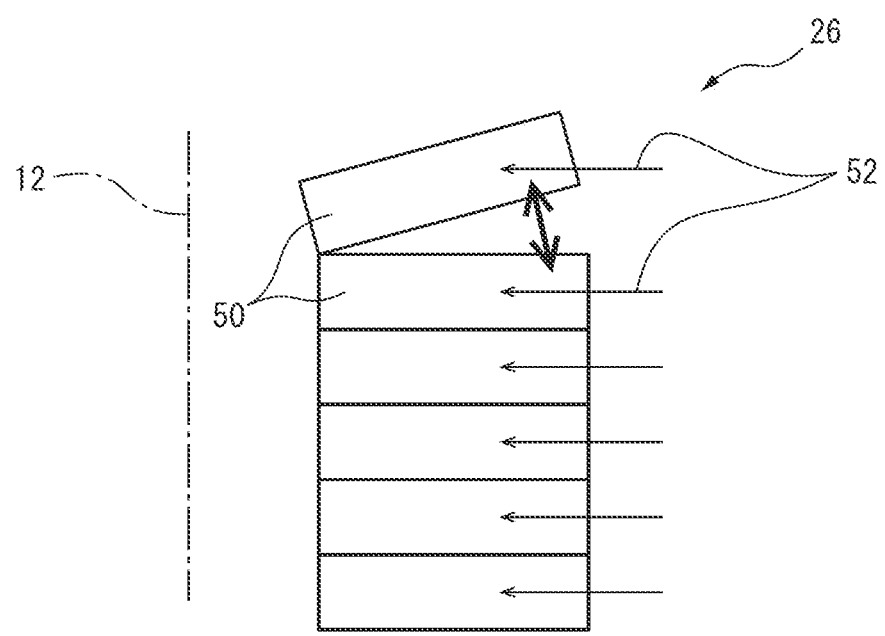
FIG. 8 is a view explaining an example wherein the rotor core of FIG. 7 is damaged.

FIGS. 7 and 8 explain as a specific example of damage to the rotor core 26, wherein the rotor core 26 is a laminate formed by laminating a plurality of electromagnetic steel sheets 50 in the direction of the axis 12. During operation of the electric motor 10 having the rotor core 26, the radially inward magnetic fluxes 52 passing through the rotor core 26 repel each other as shown in FIG. 8, thereby a force to cause the core to open (the electromagnetic steel plates 50 separate from each other) is generated. Therefore, when the electric motor 10 is operated for a long period of time, the rotor core 26 may be damaged.

Therefore, in the present embodiment, the convex part 42 of the end plate 30 presses the rotor core 26 at the end of each magnet 28 as shown in FIG. 5, thereby preventing the rotor core 26 as shown in FIG. 8 from being damaged. When the rotor core 26 has the engaging part 38 (FIG. 4), by at least partially (preferably entirely) pressing the engaging part 38 by the convex part 42 of the end plate 30 when viewed in the axial direction (FIG. 5), the damage as shown in FIG. 8 can be more effectively prevented.

As described above, in the present embodiment, the central part of the magnet, which has a large influence on the motor characteristics due to magnetic flux leakage, is partially covered by the concave part 40 of the end plate 30 so as to reduce the contact area with the end plate and reduce the magnetic flux leakage. On the other hand, the circumferential ends of the magnets, which have little influence on the rotor core, are covered by the convex part 42 of the end plate 30 to increase the contact area with the end plate, thereby reliably preventing damage to the rotor core. In addition, since the end plate 30 can have the same size and the same shape in its thickness direction, it can be easily machined and manufactured, leading to reduced cost of the rotor 14 and the electric motor 10.

Second Example

Figure 9:
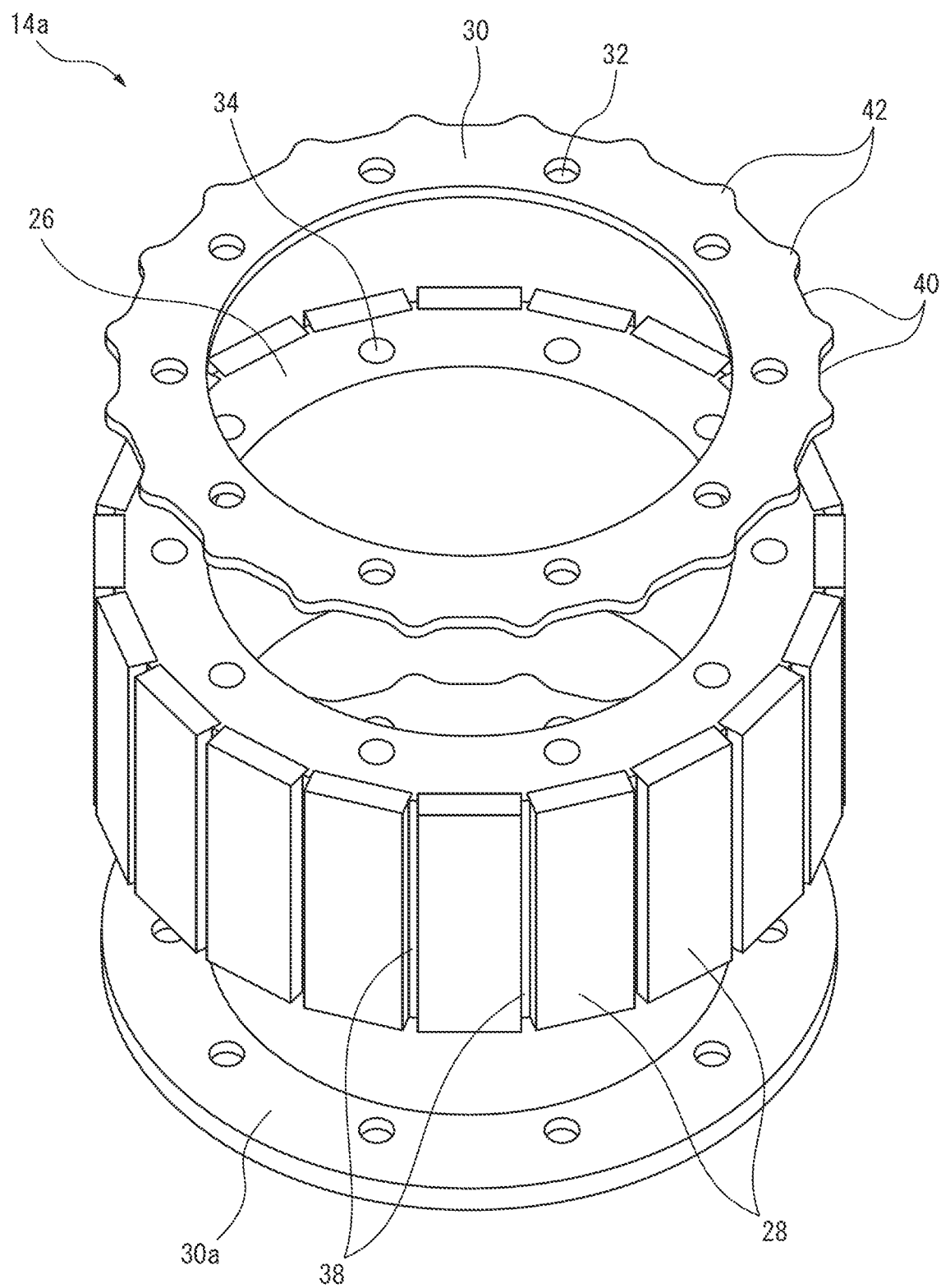
FIG. 9 is an exploded perspective view of a rotor according to a second example.
Figure 10:
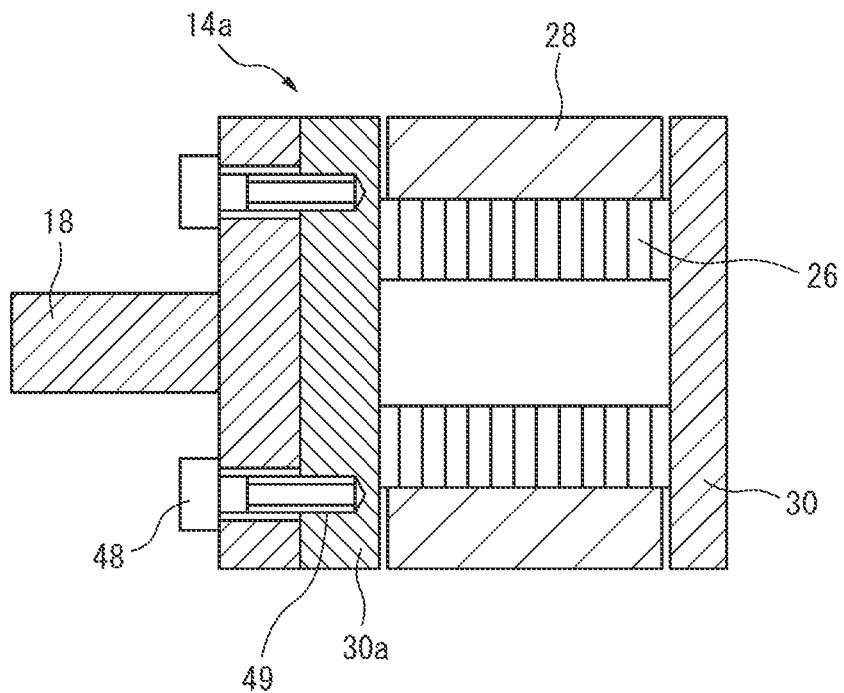
FIG. 10 is a schematic side view of the rotor of FIG. 9.

FIGS. 9 and 10 are an exploded perspective view and an axial sectional view of a rotor 14a according to the second example, respectively. In the second example, only components different from the first example will be described, and descriptions of components which may be the same as the first example will be omitted.

In the first example, each of the two end plates 30 has the concave part 40 and the convex part 42, but in the second example, only one end plate is identical to the end plate 30 of the first example, and the other end plate 30a does not have a concave part and a convex part, and the outer peripheral part thereof has a simple circular shape. Therefore, the end plate 30a can be manufactured at low cost without using complicated machining, and therefore the rotor 14a and the electric motor including the rotor 14a can also be manufactured at low cost. Also in the second example, a similar effect as in the first example can be obtained by the end plate 30 having the concave part 40 and the convex part 42.

FIG. 10 shows an example of a connection form between the rotor 14a and the shaft 18. When the two end plates have different shapes as in the second example, the shaft 18 is preferably attached to the end plate 30a. Specifically, the shaft 18 and the end plate 30a can be connected together by threading fasteners 48, such as bolts, into threaded holes 49 formed in the end plate 30a.

Third Example

Figure 11:
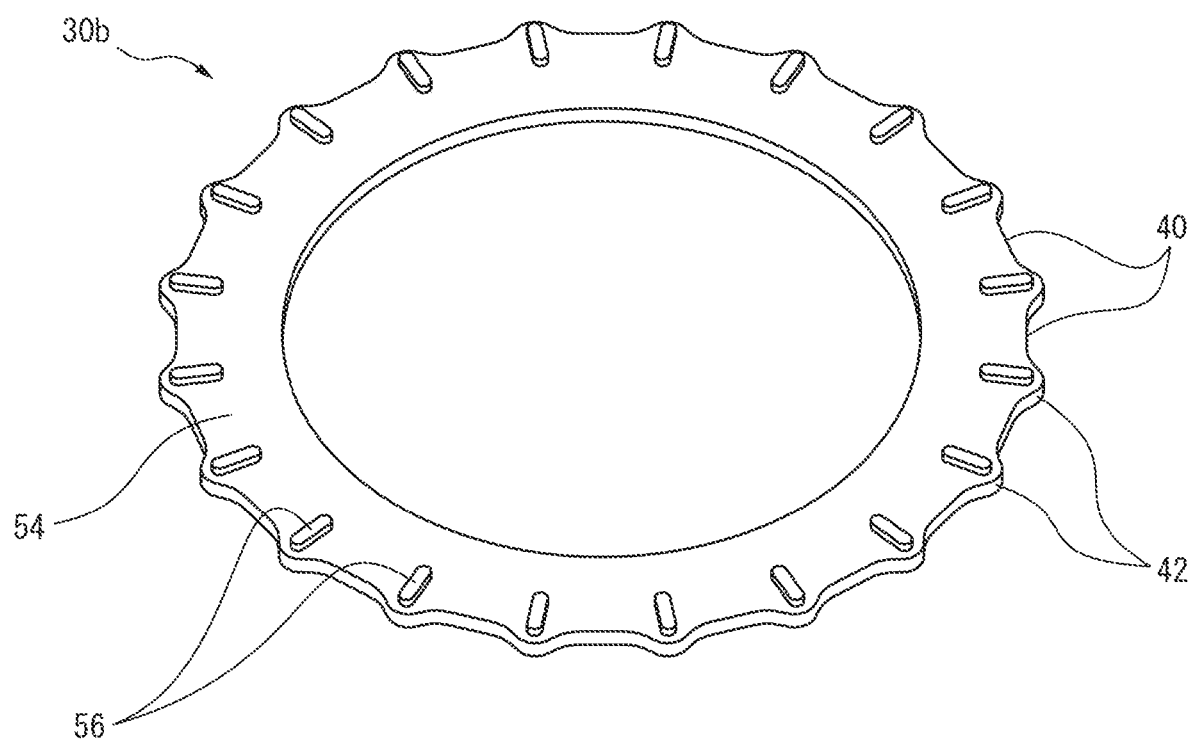
FIG. 11 is a perspective view of a first surface of an end plate of a rotor according to a third example.
Figure 12:
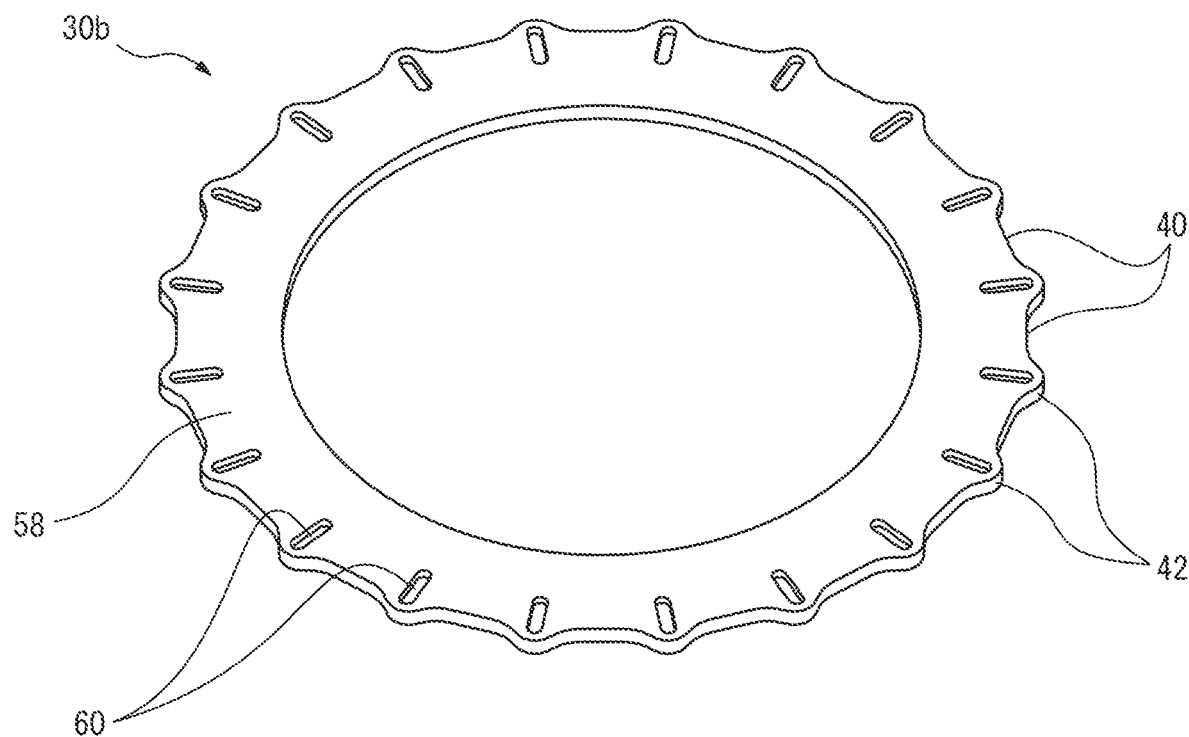
FIG. 12 is a perspective view of a second surface of the end plate of FIG. 11.

FIGS. 11 and 12 show a front surface and a back surface a rotor 14b according to the third example, respectively. In the third example, only components different from the first example will be described, and descriptions of components which may be the same as the first example will be omitted.

The end plate 30b has a concave part 40 and a convex part 42 similar to those of the end plate 30 according to the first example, as well as a raised part 56 which protrudes (projects) from a first surface 54 facing the rotor core 26. The raised part 56 is provided at the same position as the convex part 42 in the circumferential direction, i.e., at the position between the plurality of magnets 28 (when the rotor core 26 has the ridge 38, the position of the ridge 38).

The raised part 56 may be formed by various methods, and can be easily formed by press molding, for example. When the press molding is used, a depression 60 is formed at the position corresponding to the raised part 56 on the back side of the raised part 56, i.e., on a second surface 58 opposite to the first surface 54 of the end plate 30b.

Figure 13:
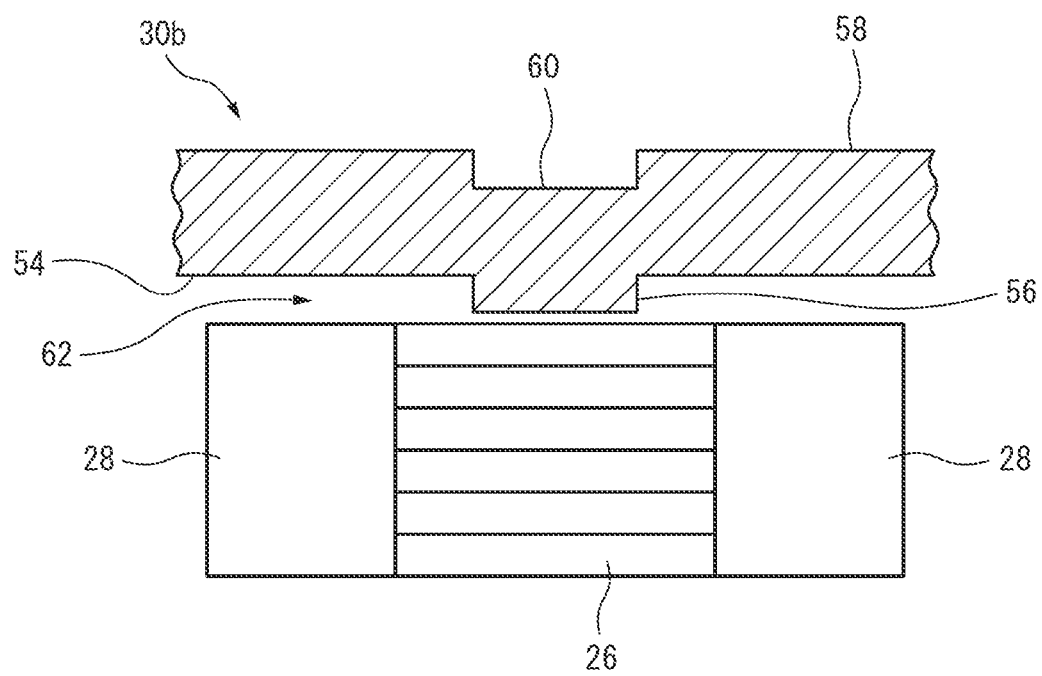
FIG. 13 is a schematic view showing a positional relationship between the end plate and the rotor core in the third example.

FIG. 13 shows the positional relationship between the end plate 30b, the rotor core 26, and the magnet 28. Due to the raised part 56 on the first surface 54, the surface pressure of the raised part 56 against the rotor core 26 is greater than when the first surface 54 is flat, thereby the axial end part of the rotor core 26 is pressed more firmly. Further, when the rotor core 26 has the ridge 38, by pressing the axial end of the ridge 38 with the raised part 56, the rotor core 26 can be pressed more firmly. In addition, the back side of the portion where the raised part 56 is formed has the depression 60, so that the end plate 30b can be partially corrugated. Therefore, it is possible to increase the strength of the end plate 30b by the same principle as a flute portion of corrugated cardboard.

Further, since the end plate 30b has the raised part 56, an air gap 62 is formed between the magnet 28 and the first surface 54 of the end plate 30b, so that magnetic flux leakage can be reduced effectively.

REFERENCE SIGNS LIST 10 electric motor
12 rotation axis
14, 14a rotor
16 stator
18 shaft
20, 22 bearing
24 housing
26 rotor core
28 magnet
30, 30a, 30b end plate
32, 34 hole
36 bolt
38 engaging part
40 concave part
42 convex part
50 electromagnetic steel plate
56 raised part
66 depression

The invention claimed is:

1. A rotor comprising:
   a rotor core configured to rotate about a rotation axis;
   a plurality of magnets attached to a surface of the rotor core; and
   first and second end plates made of magnetic material, which are positioned so as to sandwich both end surfaces of the rotor core in an axial direction of the rotation axis,
   wherein an outer peripheral part of the first end plate has a concave part which partially covers each of the magnets when viewed in the axial direction, and a convex part having a dimension larger than the concave part in a radial direction of the rotor core, and positioned between the plurality of magnets, and an outer peripheral part of the second end plate has a circular shape with no concave or convex part.

2. The rotor according to claim 1, wherein the rotor core has, between the plurality of magnets, an engaging part configured to engage a side surface of the magnet and having a larger dimension in the radial direction than a portion of the rotor core to which the magnet is attached, and wherein the convex part is configured to at least partially cover the engaging part when viewed in the axial direction.

3. The rotor according to claim 1, wherein the first end plate has a raised part protruding in a thickness direction of the end plate and abutting on an axial end portion of the rotor core or the engaging part of the rotor core.

4. The rotor according to claim 1, wherein first end plate has a uniform thickness across its surface.

5. An electric motor comprising:
   the rotor according to claim 1; and
   a stator in which the rotor is arranged.

6. The rotor according to claim 1, wherein the second end plate has a hole for attaching a shaft configured to rotate about the rotation axis to the second end plate.

* * * * *